United States Patent
Knobbe Eschen et al.

(10) Patent No.: US 11,703,029 B2
(45) Date of Patent: Jul. 18, 2023

(54) ROTOR BLADE FOR A WIND POWER INSTALLATION, ROTOR FOR A WIND POWER INSTALLATION, STRUCTURE AND WIND POWER INSTALLATION

(71) Applicant: Wobben Properties GmbH, Aurich (DE)

(72) Inventors: Henry Knobbe Eschen, Bremen (DE); Jochen Stemberg, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/381,077

(22) Filed: Jul. 20, 2021

(65) Prior Publication Data

US 2022/0025847 A1    Jan. 27, 2022

(30) Foreign Application Priority Data

Jul. 21, 2020 (DE) .......................... 102020119164.2

(51) Int. Cl.
*F03D 1/06* (2006.01)
*F03D 13/20* (2016.01)

(52) U.S. Cl.
CPC .......... *F03D 1/0633* (2013.01); *F03D 13/20* (2016.05); *F05B 2240/132* (2013.01); *F05B 2240/211* (2013.01)

(58) Field of Classification Search
CPC ........ F03D 1/04; F03D 1/0633; F03D 1/0675; F03D 13/10; F03D 13/20; F03D 7/022; F03D 80/00; F05B 2240/305; F05B 2260/96; F05B 2240/132; F05B 2240/211; F05B 2240/30; F05B 2240/304; F05D 2240/30; Y02E 10/72; Y02E 10/728; Y02B 10/30

See application file for complete search history.

(56) References Cited

U.S. PATENT DOCUMENTS

| | | | |
|---|---|---|---|
| 4,789,117 A | 12/1988 | Paterson et al. | |
| 8,047,784 B2 * | 11/2011 | Bonnet | F03D 1/0675 416/62 |

(Continued)

FOREIGN PATENT DOCUMENTS

| | | |
|---|---|---|
| DE | 102011012965 A1 | 9/2012 |
| DE | 102017004288 A1 | 11/2018 |

(Continued)

*Primary Examiner* — Aaron R Eastman
(74) *Attorney, Agent, or Firm* — Seed Intellectual Property Law Group LLP

(57) ABSTRACT

A rotor blade for a rotor, in particular of a wind power installation, having a rotor-blade length constituted between a root region and a rotor-blade tip, a rotor-blade depth constituted between a leading edge and a blunt trailing edge, a rotor-blade thickness constituted between a pressure side and a suction side, a suction-side trailing-edge region extending on the suction side and/or a pressure-side trailing-edge region extending on the pressure side, the suction-side trailing-edge region and/or the pressure-side trailing-edge region extending from the blunt trailing edge in the direction of the leading edge with an extent of less than 30%, in particular less than 20%, of the chord, and the suction-side trailing-edge region and/or the pressure-side trailing-edge region having at least one eddy generator.

15 Claims, 6 Drawing Sheets

(56) References Cited

U.S. PATENT DOCUMENTS

| | | | |
|---|---|---|---|
| 2012/0269644 A1* | 10/2012 | Enevoldsen | F03D 1/0641 |
| | | | 416/235 |
| 2014/0271213 A1 | 9/2014 | Yarbrough et al. | |
| 2015/0292522 A1* | 10/2015 | Singh | F03D 1/0683 |
| | | | 416/228 |
| 2015/0361952 A1 | 12/2015 | Petsche et al. | |
| 2018/0238298 A1 | 8/2018 | Grasso | |
| 2021/0079886 A1 | 3/2021 | Kneissl et al. | |

FOREIGN PATENT DOCUMENTS

| | | |
|---|---|---|
| DE | 102018103678 A1 | 8/2019 |
| EP | 2548801 A1 | 1/2013 |
| EP | 2 713 044 A1 | 4/2014 |
| EP | 3 029 313 A1 | 6/2016 |
| EP | 3 309 388 A1 | 4/2018 |
| EP | 3 480 457 A1 | 5/2019 |
| GB | 2526847 A | 12/2015 |
| WO | 2014/064195 A1 | 5/2014 |
| WO | 2015/062710 A1 | 5/2015 |
| WO | 2016/055076 A1 | 4/2016 |

* cited by examiner

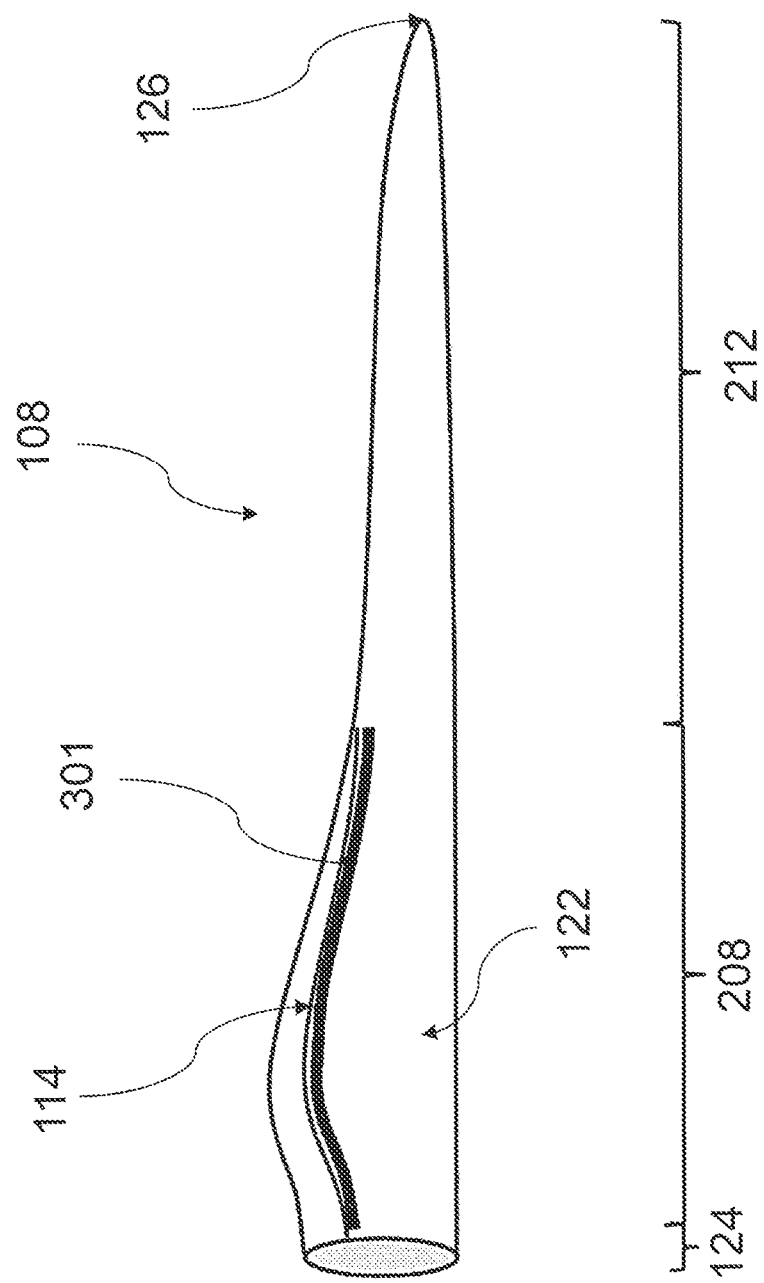

ROTOR BLADE FOR A WIND POWER INSTALLATION, ROTOR FOR A WIND POWER INSTALLATION, STRUCTURE AND WIND POWER INSTALLATION

BACKGROUND

Technical Field

The invention relates to a rotor blade for a wind power installation, a rotor for a wind power installation, a structure, and a wind power installation having a rotor and/or a structure.

Description of the Related Art

Wind power installations have a rotor that has at least one, two or more rotor blades, preferably three rotor blades, and are designed to generate mechanical rotational energy from kinetic wind energy, and to generate electrical energy from this. Such wind power installations are generally known and usually comprise a nacelle, on which the rotor is arranged, and a tower, on which the nacelle with the rotor is arranged so as to be rotatable about a substantially vertically-aligned axis.

Wind power installations are usually realized as so-called horizontal-axis wind power installations, which comprise a rotor that has a substantially horizontal axis, the rotor blades of which rotate in a plane substantially perpendicular to the wind. Such horizontal-axis wind power installations use the aerodynamic principle of lift to convert the kinetic wind energy into mechanical rotational energy. In this case, a profile of a rotor blade realizes a suction side and a pressure side, such that, when moving air flows around the profile, a negative pressure is created on the suction side relative to the pressure side. The resulting pressure difference between the pressure side and the suction side produces an aerodynamic lift. The lift in this case depends, for example, on the angle of attack of the rotor blades.

Known rotor blades are disadvantageous in that the adjacent airflow separates, especially on a suction side, and a so-called "dead wake zone" forms with a separated flow. At greater angles of attack, in particular, the flow can no longer bear smoothly against the profile of a rotor blade, and it separates. The dead wake region reduces the lift of the rotor blade, and decelerates the rotor blade by increasing its drag. This reduces the efficiency of the rotor and thus also the yield of a wind power installation.

Various solutions are known to improve the aerodynamic properties of rotor blades and to increase efficiency. For example, it is known to provide vortex generators in a region between 10% and 60% of the profile chord length, starting from a leading edge of the profile. The vortex generators serve to create local regions of turbulent airflows over a surface of the rotor blade in order to increase resistance to flow separations. For this purpose, turbulators swirl a wall-proximal flow on the rotor blade, as a result of which the momentum exchange between wall-proximal and wall-distal flow layers increases strongly and the flow velocities in the wall-proximal boundary layer increase. The vortex generators themselves in this case generate drag, such that the yield of the wind power installation cannot be increased, or can only be increased slightly. Another disadvantage of this arrangement of the vortex generators is that they generate loud noise.

It is also known to use rotor blades that have an at least partially blunt trailing edge in the inner region. Such rotor blades are disadvantageous, in particular, in that the lift capacity is reduced in the region of the blunt trailing edge due to the lesser blade depth and, in addition, vortices can form in this region, in the form of a so-called Kaman vortex street, which results in increased air resistance and increased noise emission.

Also known for the purpose of reducing drag are modifications of flat profile trailing edges by hollowing-out or by the insertion of cut-outs or recesses. For example, U.S. Pat. No. 4,789,117, 1988 describes an undulated trailing edge on blunt bodies for the purpose of drag reduction. However, such modifications to a rotor blade would be associated with considerable structural problems, especially since there is usually load-bearing laminate in the region of the modification.

The use of additional splitter plates, which are designed to split an alternating vortex street behind a blunt body into two stationary vortices, and thus reduce the drag, is also known. However, an additional splitter plate on a rotor blade results in a greater rotor-blade depth, which has a negative effect on the transport dimensions and results in increased system loads due to the greater rotor-blade depth.

The existing devices to improve the aerodynamic properties of rotor blades and increase efficiency offer various advantages, but further improvements are desirable.

Moreover, wind power installations can be subject to site-dependent framework conditions such as, for example, with regard to a sound level that is not to be exceeded. In order to reduce the sound level, wind power installations are often operated in a sound-reduced operating mode, generally with a reduced nominal rotor speed compared to the power-optimized operating mode.

BRIEF SUMMARY

Provided is a rotor blade for a wind power installation, a rotor for a wind power installation, a structure, and a wind power installation having a rotor and/or having a structure, which reduce or eliminate one or more of the disadvantages mentioned. In particular, provided are techniques to further increase the efficiency of a rotor blade of a wind power installation for a high system efficiency and, at the same time, to effect a reduction of acoustic emission. In particular, provided are techniques to improve aerodynamic properties of a rotor blade for a wind power installation, of a rotor for a wind power installation, of a structure, and of a wind power installation having a rotor and/or having a structure, without impairing structural properties thereof.

According to a first aspect, provided is a rotor blade for a wind power installation, having a rotor-blade length constituted between a root region and a rotor-blade tip, a rotor-blade depth constituted between a leading edge and a blunt trailing edge, a rotor-blade thickness constituted between a pressure side and a suction side, a suction-side trailing-edge region extending on the suction side and/or a pressure-side trailing-edge region extending on the pressure side, the suction-side trailing-edge region and/or the pressure-side trailing-edge region extending from the blunt trailing edge in the direction of the leading edge with an extent of less than 30%, in particular less than 20%, of the chord, and the suction-side trailing-edge region and/or the pressure-side trailing-edge region having at least one turbulator.

One or more embodiments are based on the realization that the dead wake region, where wake turbulences occur, causes a large part of the aerodynamic drag of blunt bodies. The inventors have discovered that a Kaman vortex street, i.e., periodically separating vortex pairs, and in comparison smaller disordered vortex pairs, forms in this dead wake region, such that energy is removed from the flow, causing a high flow resistance.

The rotor blade extends, in particular, in the direction of the rotor-blade length, the rotor-blade depth and the rotor-blade thickness. In the direction of the rotor-blade length, the rotor blade extends between a root region and a rotor-blade tip. In particular, the rotor-blade depth is oriented substantially orthogonal to the rotor-blade length and extends between the leading edge and the blunt trailing edge. In operation, the rotor-blade depth is oriented substantially parallel to a direction of incident flow on the rotor blade. In particular, substantially orthogonal to the direction of the rotor-blade length and the rotor-blade depth, the rotor blade extends in the direction of the rotor-blade thickness. In particular, the rotor-blade depth and the rotor-blade thickness define an aerodynamic profile at substantially every position along the rotor-blade length. To increase efficiency, the rotor blade comprises at least one turbulator arranged in or at a region of the blunt trailing edge, on the pressure side and/or on the suction side. This region, called the trailing-edge region, extends from the blunt trailing edge of the rotor blade in the direction of the leading edge. The trailing-edge region has an extent of less than 30%, in particular less than 20%, of the chord.

The at least one turbulator may be arranged on the blunt trailing edge, in particular on an edge formed by the blunt trailing edge and the suction side, or in a region in front of the blunt trailing edge between 70% and 100%, in particular between 80% and 100%, of the chord measured from the leading edge.

The suction side of the rotor blade may in particular correspond to a face of the rotor blade that generates lift during operation of the wind power installation and thus drives the rotation of a rotor to which the rotor blade is attached when air flows around it. The pressure side may in particular be opposite the suction side. When air flows around it, a boundary layer is formed, in particular, both on the suction side and on the pressure side.

A blunt trailing edge may be understood to mean, in particular, that the rotor blade still has a specific trailing-edge height at its rear end, i.e., at the trailing edge, and therefore does not taper substantially to a point.

In particular, a profile course of the rotor blade may have a number of profile sections that define the outer contour of the rotor blade. A rotor blade usually comprises a plurality of different profile sections. The profile sections are intended to enable a substantially aerodynamically optimal flow pattern at the various radius positions of a rotor blade. In particular, at least one profile section of the plurality of profile sections may have the blunt trailing edge. In particular, the blunt trailing edge may have a trailing-edge height of more than 0.5% of a profile-section depth of the profile section. Preferably, further profile sections, in particular the profile sections of the rotor blade that are located further in the direction of the blade tip, may be without a blunt trailing edge.

Arranging the at least one turbulator in the trailing-edge region on the suction side and/or the pressure side makes it possible to achieve an increased mixing of a separation at the blunt trailing edge with energetic flow, and consequently a size of the dead wake region, in which wake turbulences occur, behind blunt bodies can be significantly reduced. In particular, this arrangement of turbulators can prevent or at least reduce the formation of the disordered vortices whose axis of rotation is substantially perpendicular to a plane of the blunt trailing edge. As a result, the pressure in the region behind the profile increases significantly and the flow resistance is reduced, in particular as a result of reduction of the size of the separation region behind the profile. It is the case that a frictional resistance of the profile is also slightly increased by additional flow surfaces of the at least one turbulator. Due to the pressure resistance that can be achieved, however, an overall reduction in drag can be achieved by the at least one turbulator in the trailing-edge region. At the same time, the flow around thick profiles, especially in the root region of rotor blades of a wind power installation, can be optimized by the at least one turbulator. Consequently, by means of the at least one turbulator, the performance of a rotor blade having a blunt trailing edge can thus be improved, in particular in the region of the blunt trailing edge.

A further advantage of the present solution is that the formation of alternating wake vortices can be prevented by deliberate disturbance of a homogeneous flow at the blunt trailing edge, or behind the blunt trailing edge, of the profile, such that no acoustically relevant periodic vortex streets form, and the flow resistance at the profile section is reduced. Acoustic emission can thereby be reduced.

Accordingly, by arranging the at least one turbulator in the trailing-edge region on the suction side and/or the pressure side, the aerodynamic properties of the rotor blade, in particular on an inner blade, can be improved without impairing structural properties. It is also advantageous that the proposed solution can increase the overall efficiency of a wind power installation, and thus an annual yield.

The arrangement of the at least one turbulator at the suction-side and/or pressure-side trailing-edge region also represents, in particular, a cost-effective measure for improving the performance and the acoustic properties of the rotor blade, in particular at the blunt trailing edge. In particular, the construction of the rotor blades in the region of the blunt trailing edge and/or a structural design of the rotor blades, and in particular the production, can be simplified in order to reduce costs. In particular, this can reduce a complexity of previous manufacturing processes of rotor blades. In the production of a trailing edge, for example, the proposed solution makes it possible to omit the use of contour inserts for achieving a perfectly sharp trailing edge, such that costs can be saved.

In particular, the advantages described above can be achieved without changing an outer dimension, in particular a rotor-blade length and a rotor-blade depth, of the rotor blade. For example, this solution allows a profile section that has the blunt trailing edge further out, i.e., further towards the blade tip, on the rotor blade, and/or higher profile sections having the blunt trailing edge, to be used without increasing acoustic emission, in order to achieve further structural advantages. Owing to the gain in relative thickness further out on the rotor blade, it is possible to realize rotor blade geometries that are structurally more advantageous. This makes it possible to use lighter and more cost-effective rotor blades.

The above-mentioned advantages can be achieved by the proposed solution, in particular without affecting the operating load.

The rotor blade described here is not limited to use in wind power installations, even though it can be used particularly advantageously and economically here. Rather, the rotor blade described here can also be used for propellers, helicopter rotors or other turbomachines. For example, by arranging the at least one turbulator in the trailing-edge region on the suction side and/or the pressure side, the flow on thick profiles of propellers, helicopter rotors or other turbomachines can also be optimized.

Particularly preferably, at least two, three or more turbulators may be arranged at the suction-side trailing-edge region and/or the pressure-side trailing-edge region. More preferably, the at least two, three or more turbulators may be arranged spaced apart from each other and/or substantially evenly distributed in the direction of the rotor-blade depth and/or substantially at the blunt trailing edge or at a substantially identical distance from the blunt trailing edge. The arrangement of at least two, three or more turbulators enables both the drag and the acoustic emission of the rotor blade to be further reduced. At the same time, a flow around thick profiles, especially in the root region of rotor blades of a wind power installation, can be further optimized. The performance of a rotor blade can thereby be further improved.

It is particularly preferred if the rotor blade has a suction-side trailing-edge region extending on the suction side and a pressure-side trailing-edge region extending on the pressure side, the suction-side trailing-edge region and the pressure-side trailing-edge region extending from the blunt trailing edge in the direction of the leading edge with an extent of less than 30%, in particular less than 20%, of the chord, and the suction-side trailing-edge region and the pressure-side trailing-edge region having at least one turbulator.

In particular, it is preferred if the rotor blade has a suction-side trailing-edge region extending on the suction side, the suction-side trailing-edge region extending from the blunt trailing edge in the direction of the leading edge with an extent of less than 30%, in particular less than 20%, of the chord, and the suction-side trailing-edge region comprising at least one turbulator. Preferably, the rotor blade may have a pressure-side trailing-edge region extending on the pressure side, the pressure-side trailing-edge region extending from the blunt trailing edge in the direction of the leading edge with an extent of less than 30%, in particular less than 20%, of the chord, and the pressure-side trailing-edge region being without turbulators.

A preferred further development of the rotor blade is characterized in that the turbulator is realized in such a manner that the suction-side trailing-edge region and/or the pressure-side trailing-edge region have/has an inhomogeneous geometry, such that vortex regions forming at the blunt trailing edge are prevented or weakened. In this way, the dead wake region, and consequently also the flow resistance, can be efficiently reduced.

In particular, the turbulators may be realized as an elevation and/or a depression and/or a recess of a surface of the trailing-edge region. An inhomogeneous geometry may be understood to mean, in particular, that a surface has irregularities and preferably a certain surface roughness.

It is preferred that the turbulator has a vortex generator, in particular a pair of vortex generators, the vortex generator preferably projecting from the blunt trailing edge, the vortex generator preferably being realized as a vane vortex generator or a wishbone vortex generator.

In particular, the vortex generators may be wing-shaped, delta-shaped, horseshoe-shaped or of an alternative geometry.

A vortex generator may be understood to be, in particular, a type of disturbance body that can be attached to the profile surface. For example, they may be platelets that, in particular, can be arranged at a certain angle in relation to each other in order to increase the desired vortex formation in a certain manner, in order thereby to achieve a mixing of the separation and to reduce the dead wake region.

The vortex generator may be, for example, materially bonded to a surface, in particular glued to the surface. This makes it particularly easy to retrofit a rotor blade or equip it with vortex generators.

Preferably, the at least one turbulator and/or the vortex generator, in particular the plurality of turbulators and/or the plurality of vortex generators, may be designed to generate vortex pairs in the same direction (co-rotating) or in opposite directions (counter-rotating). In this way, a Kaman vortex street forming without turbulators and/or vortex generators, i.e., eddies separating in opposite directions, can be mixed and the size of dead wake region thereby reduced.

In a further preferred embodiment variant of the rotor blade, it is provided that the turbulator extends over a rotor-blade surface with a projection length aligned substantially parallel to the rotor-blade thickness, at least one profile section having the turbulator, preferably two or more or all profile sections having an turbulator, of the rotor blade having a trailing-edge height of the blunt trailing edge, the projection length being less than or equal to 50% of the trailing-edge height, and/or at least one profile section having the turbulator, preferably two or more or all profile sections having an turbulator, of the rotor blade having a boundary layer, having a boundary layer height, that is constituted during operation, the projection length being more than 20% of the boundary layer height.

It is particularly preferred if the projection length of a profile section is less than or equal to 50% of the trailing-edge height of this profile section and/or of an adjacent profile section. With such a projection length, the aerodynamic properties can be improved, such that the occurring frictional resistance and the pressure resistance that occurs result in an overall reduction in drag.

Boundary layers form in transition regions of parallel flows that have different velocities. In the case of a rotor blade, in particular, an airflow flowing around the rotor blade may have a velocity of zero directly at the face of the rotor blade, due to the friction between the rotor blade and the air. As the distance from a surface increases, the velocity increases until it reaches the velocity of the surrounding airflow. This transition is called a boundary layer or shear layer. The thickness of the boundary layer depends, in particular, on the internal friction of the air. In the case of a flow velocity that lies in a typical range of a flow velocity around a rotor blade during the operation of a wind power installation, the boundary layer extends beyond the end of the suction side, in particular at the blunt trailing edge of the rotor blade, and disintegrates, in particular, only at a certain distance from the blunt trailing edge of the rotor blade, for example by vortex formation. The boundary layer in this case runs along the blunt trailing edge between the wake region and the flow around the profile.

A projection length that, in particular, corresponds to at least 20% of the height of a local boundary layer can improve the aerodynamic properties, such that the occurring frictional resistance and the occurring pressure resistance result in an overall reduction in drag.

According to a further embodiment variant of the rotor blade, it is provided that the blunt trailing edge of at least one profile section is straight and extends substantially parallel to the orientation of the rotor-blade thickness, and/or a or the trailing-edge height of the blunt trailing edge of at least one profile section is more than 50%, in particular more than 60%, of the rotor-blade thickness.

Preferably, this profile section having the blunt trailing edge may be realized as a flat-back profile. A flat-back profile may be understood, in particular, as a shortened profile in the chord direction due to a thick, i.e., blunted, trailing edge, i.e., a blunt body. In principle, a profile section having a blunt trailing edge may accordingly be understood as a flat-back profile.

A straight trailing edge may be understood, in particular, as a trailing edge that substantially is not concave or convex and/or does not have curvatures. In this case, the trailing-edge height may substantially correspond to a rotor-blade thickness in this profile section.

In particular, the blunt trailing edge adjacent to the suction side and/or the blunt trailing edge adjacent to the pressure side may have a bulge and/or a concavity and/or at least one or two curvatures. In particular in this case, a height of the blunt trailing edge excluding the curvatures may be at least 50%, in particular more than 60%, of the rotor-blade thickness. This design enables the construction of the rotor blades to be further simplified in the region of the blunt trailing edge in order to achieve a cost reduction.

In a further preferred development of the rotor blade, it is provided that the rotor blade, between the root region having a substantially round cross section and an outer portion having a substantially closed profile, comprises a blunt portion that comprises the blunt trailing edge, the blunt portion extending to a relative rotor-blade length of greater than 30%, preferably greater than 40%, in particular greater than 50%.

The blunt section may accordingly have an extent, from the root region in the direction of the outer portion, that is greater than 30%, preferably greater than 40%, in particular greater than 50%, of the rotor blade length extending from the root region to the blade tip. The arrangement of the at least one turbulator allows a larger region of the rotor blade to define the blunt trailing edge. This can further improve both the aerodynamic properties and the structural properties of the rotor blade.

According to a further preferred embodiment variant of the rotor blade, it is provided that, for at least one profile section, the suction-side trailing-edge region comprises a suction-side transition region adjacent to the blunt trailing edge and/or the pressure-side trailing-edge region comprises a pressure-side transition region adjacent to the blunt trailing edge, the suction-side transition region being arranged between a suction-side profile contour and the blunt trailing edge and/or the pressure-side transition region being arranged between a pressure-side profile contour and the blunt trailing edge, the suction-side transition region and/or the pressure-side transition region preferably having a radius.

The radius of the transition region may in particular be selected in such a way that exact positioning of laminate layers and demouldability during production can be ensured.

The transition region may in particular define a rounding. Preferably, the rounding may have a convex contour. Preferably, the radius of the rounding may correspond maximally to an amount of the trailing-edge height. Preferably in this case, the at least one turbulator may be placed in the region of the rounding or immediately before the rounding, but no longer exactly on the blunt trailing edge. The region referred to as the trailing-edge region extends from the blunt trailing edge of the rotor blade in the direction of the leading edge, and in particular the rounding may be part of the trailing-edge region.

This design enables the construction of the rotor blades to be further simplified in the region of the blunt trailing edge in order to achieve a cost reduction.

Particularly preferably, the at least one turbulator is arranged in the suction-side transition region and/or in the pressure-side transition region. In this way, the wake region and thus also the flow resistance can be efficiently reduced.

In a further preferred embodiment variant, it is provided that the at least one turbulator is arranged in a suction-side proximal region and/or a pressure-side proximal region adjacent to the blunt trailing edge, the suction-side proximal region and/or the pressure-side proximal region extending with less than or equal to 10% of the chord from the blunt trailing edge in the direction of the leading edge, preferably with the suction-side proximal region comprising the suction-side transition region and/or the pressure-side proximal region comprising the pressure-side transition region.

In particular in this case, the suction-side proximal region may preferably be part of the suction-side trailing-edge region. Accordingly, in particular, the pressure-side proximal region may be part of the pressure-side trailing-edge region.

The at least one vortex generator may be arranged on the blunt trailing edge or in a region in front of the blunt trailing edge, between 90% and 100% of the chord measured from the leading edge. It is thereby possible to further increase mixing of a separation at the blunt trailing edge with energetic flow, and thus to further reduce the size of the dead wake region, in which wake turbulences occur.

In particular, preferably a suction-side turbulator may be arranged on the suction side and a pressure-side turbulator on the pressure side, the suction-side turbulator and the pressure-side turbulator preferably being arranged at the same position in respect of a relative rotor-blade length, or being arranged offset in relation to each other in respect of the relative rotor-blade length. Preferably in this case, the suction-side turbulator and the pressure-side turbulator may be of substantially identical structural design and differ, in particular, only in one arrangement. Alternatively, different turbulator types may be used, for example. This design allows the turbulators to be arranged according to the rotor blade geometry and/or other influencing factors.

A further preferred further development of the rotor blade is characterized in that the rotor blade comprises a suction-side leading-edge region extending on the suction side and/or a pressure-side leading-edge region extending on the pressure side, the suction-side leading-edge region and/or the pressure-side leading-edge region extending from the leading edge in the direction of the blunt trailing edge with an extent of less than 80%, in particular less than 70%, of the chord, the suction-side leading-edge region and/or the pressure-side leading-edge region having at least one further turbulator, and/or comprising a structural portion that comprises the root region and has a substantially circular profile section, there being at least one further turbulator arranged in the structural portion.

Preferably, the further turbulators are arranged in a front profile region and/or between a circular connection of the root region and the last profile section. This design additionally enables the flow at the profile surface to be stabilized, and the achievable lift to be increased. Preferably in this case, separation of a boundary layer with low energy due to surface friction can be prevented in that the low-energy boundary layer is mixed with fresh, high-energy flow away from the profile surface. This energy enrichment enables the boundary layer to overcome a greater pressure gradient, in order to prevent separation and/or to enable higher operating angles of attack.

It was found that, in particular by a combination of turbulators at the suction-side and/or pressure-side trailing-edge region and turbulators at the suction-side and/or pressure-side leading-edge region, the aerodynamic properties can be further improved.

A further preferred further development of the rotor blade is characterized in that the rotor blade comprises at least two turbulators, between which there is a distance in the direction of the rotor-blade length, this distance being at least 1 times to maximally 100 times, preferably at least 1 times to maximally 70 times, further preferably at least 2 times to maximally 50 times, further preferably at least 2 times to maximally 40 times, further preferably at least 3 times to maximally 30 times, further preferably at least 4 times to maximally 20 times, further preferably at least 5 times to maximally 15 times, the projection length of the at least two turbulators.

In particular, preferably, the distance may correspond to at least 1 times or 2 times or 3 times or 4 times or 5 times the projection length of the at least two turbulators. Further preferably, the distance may correspond maximally to 100 times or 90 times or 80 times or 70 times or 60 times or 50 times or 40 times or 30 times or 25 times or 20 times or 15 times the projection length of the at least two turbulators. In particular, a further increased drag reduction can be achieved by this distance.

It is further preferred that the rotor blade comprises a plurality of turbulators, there being a distance between the plurality of turbulators in the direction of the rotor blade length, the distance becoming smaller the further the turbulators are spaced from the root region, and/or a projection length of the plurality of turbulators becoming smaller with greater spacing from the root region, preferably the projection length of the plurality of turbulators becoming smaller discontinuously, and further preferably two or three different projection lengths being provided.

In particular, preferably, the rotor blade may comprise between 10 and 100 turbulators.

Preferably, also, no continuous arrangement of turbulators may be provided. In particular in this case, the distance between the turbulators may be irregular or have an irregularity.

The turbulators are arranged and/or have such dimensions, in particular such projection lengths, such that a required sound emission and/or reduction of drag can be achieved.

According to a further aspect, provided is a rotor for a wind power installation comprising at least one rotor blade as described above.

Furthermore, provided is a structure, in particular a tower, preferably for a wind power installation, comprising a static unit, in particular a tower wall, the static unit having at least one turbulator.

The turbulators could help to modify, or reduce, the vibrations of the Karman vortices. Furthermore, in particular, structures may be equipped with such turbulators in order to reduce resonance phenomena and wind loads.

This design allows, for example, a tower with a constant outer radius to be used for a wind power installation. Also, in particular, a diameter of such a tower can be reduced. The transport dimensions can thus be reduced.

According to a further aspect provided is a wind power installation, comprising a rotor, as described above, and/or a structure, as described above.

An advantage of the present solution is that a reduced region having separated flow behind profile sections can significantly reduce a radially outwardly directed air mass flow in the dead wake region, which removes additional energy from the wind power installation operation. As a result, more powerful and cost-efficient wind power installations can be achieved.

For further advantages, embodiment variants and embodiment details of the further aspects and their possible further developments, reference is also made to the previously given description of the corresponding features and further developments of the rotor blade.

BRIEF DESCRIPTION OF THE SEVERAL VIEWS OF THE DRAWINGS

Preferred exemplary embodiments are explained by way of example on the basis of the accompanying figures, in which:

FIG. 6 shows a schematic view of a rotor blade in a view of the pressure side with vortex generators.

In the figures, identical or substantially functionally identical or similar elements are denoted by the same references.

DETAILED DESCRIPTION

The explanation of the invention on the basis of examples with reference to the figures is substantially schematic, and the elements explained in the respective figure may be exaggerated therein for better illustration and other elements may be simplified. Thus, for example, FIG. 1 illustrates a wind power installation as such schematically, such that a provided arrangement of vortex generators is not apparent.

Figure 1:
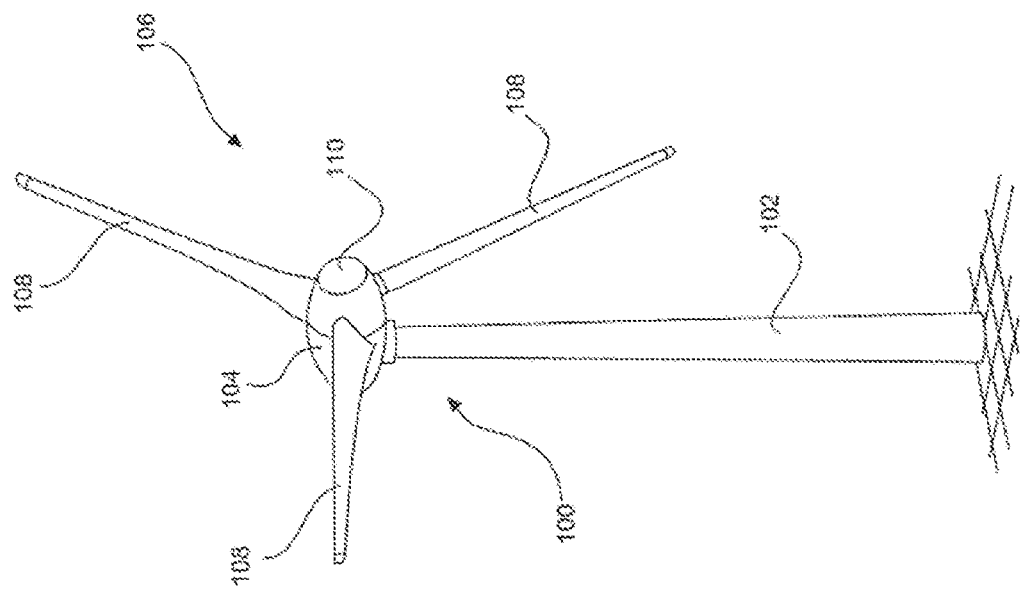
FIG. 1 shows a schematic, three-dimensional view of an exemplary embodiment of a wind power installation.

FIG. 1 shows a schematic, three-dimensional view of a wind power installation 100. The wind power installation 100 comprises a tower 102, and a nacelle 104 on the tower 102. An aerodynamic rotor 106 comprising three rotor blades 108 and a spinner 110 is provided on the nacelle 104. The rotor blades 108 in this case comprise at least one turbulator (not visible in FIG. 1) at or in a suction-side trailing-edge region and/or a pressure-side trailing-edge region, as shown in FIGS. 2 to 6. During operation of the wind power installation 100, the aerodynamic rotor 106 is caused to rotate by the wind and thus also rotates an electrodynamic rotor or armature of a generator that is directly or indirectly coupled to the aerodynamic rotor 106. The electrical generator is arranged in the nacelle 104 and generates electrical energy.

Figure 2:
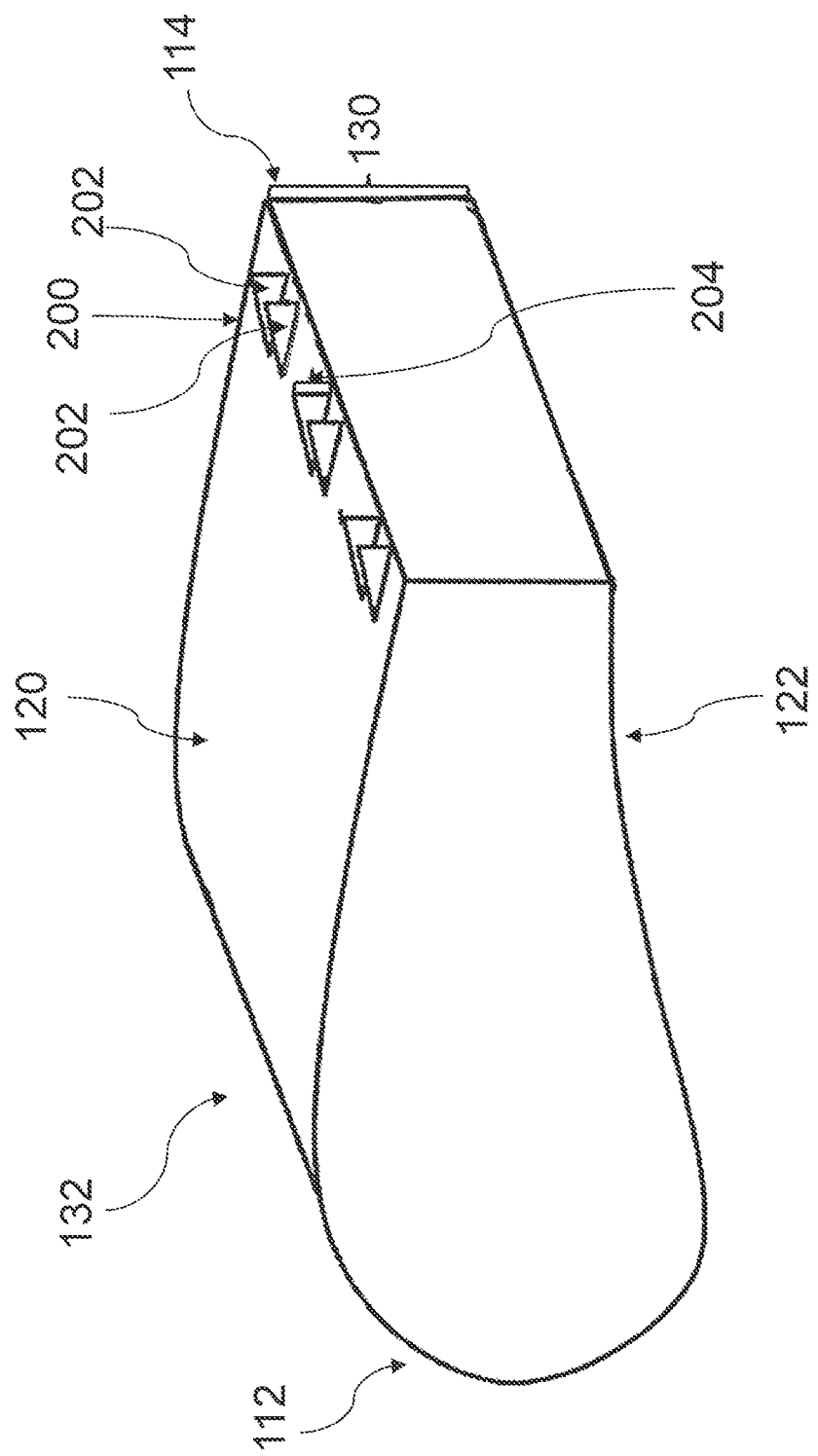
FIG. 2 shows a schematic view of a profile section having a blunt trailing edge and vortex generators at the suction-side trailing-edge region.
Figure 3:
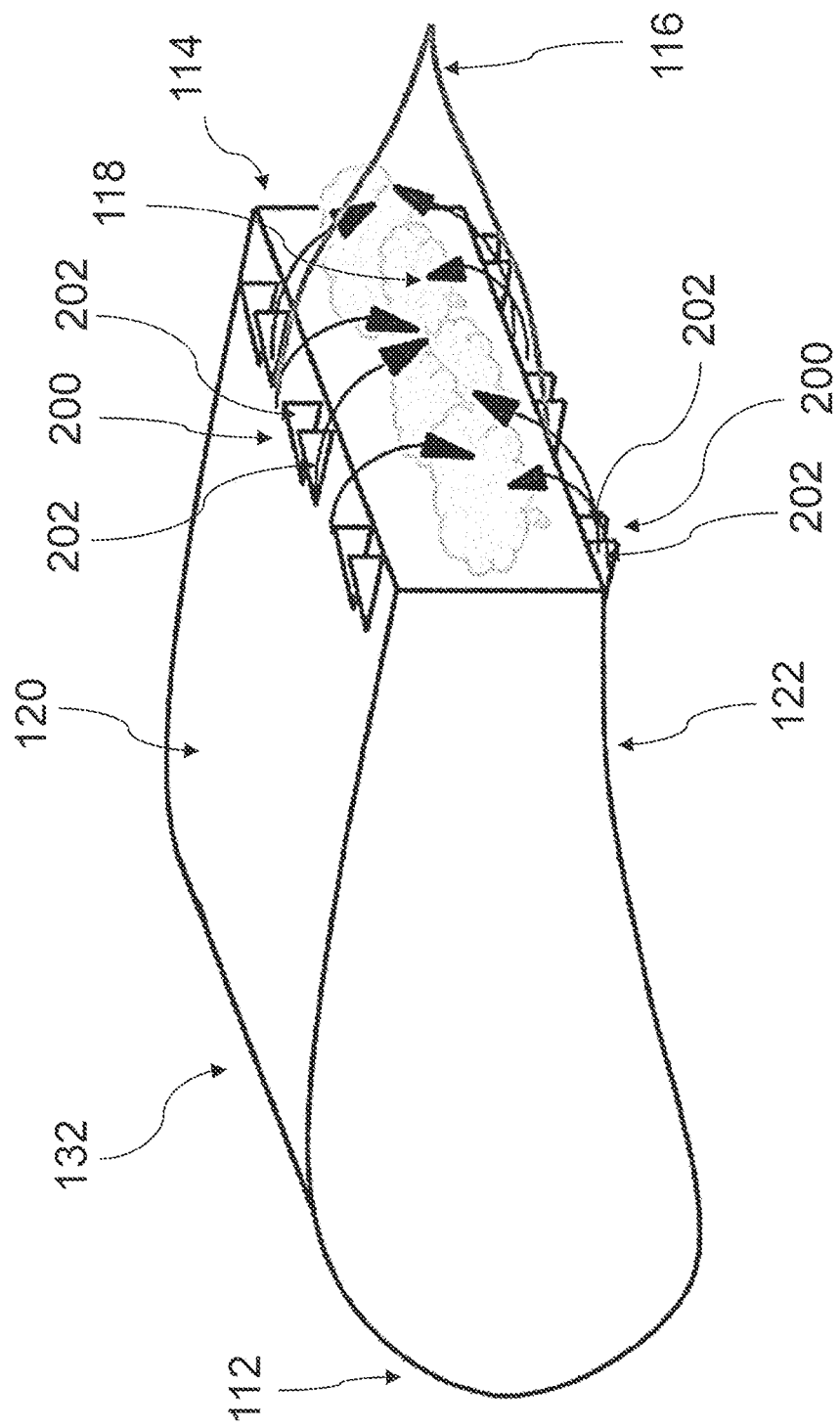
FIG. 3 shows a schematic view of a profile section having a blunt trailing edge and vortex generators at the suction-side trailing-edge region and the pressure-side trailing-edge region.
Figure 4:
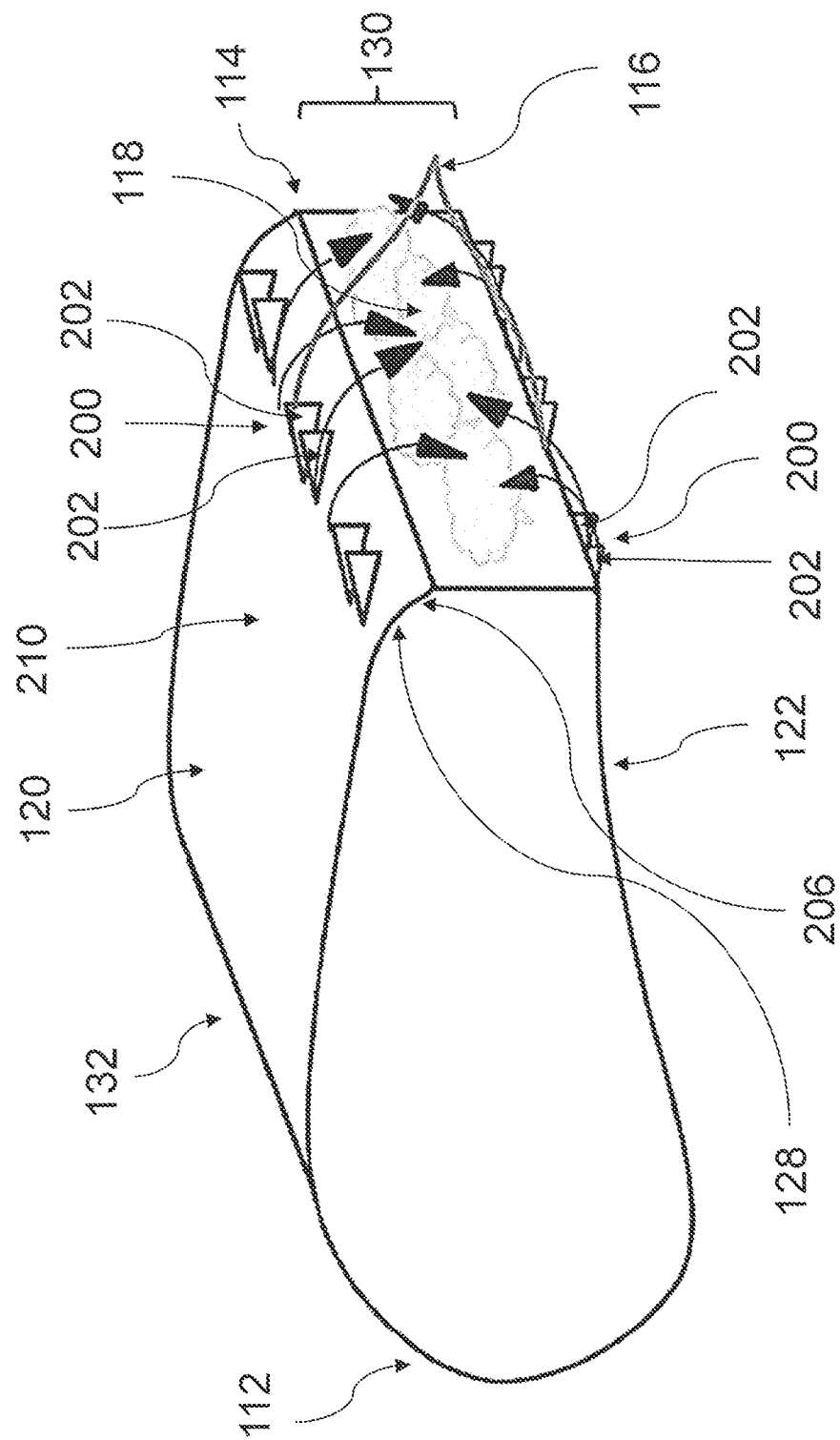
FIG. 4 shows a schematic view of a profile section having a blunt trailing edge and an additional curvature in the region of the trailing edge, with vortex generators at the suction-side trailing-edge region in a region before the curvature and the pressure-side trailing-edge region.

FIGS. 2 to 4 each show a profile section 132 having a blunt trailing edge 114, which can also be referred to as a flat-back profile. The blunt trailing edge 114 in this case has a specific trailing-edge height 130 (denoted in FIG. 2) and defines a profile shortened in the chord direction. The profile section 132 has a rotor-blade depth between the leading edge 112 and the blunt trailing edge 114. In particular, the profile section 132 corresponds to the cross section of a rotor blade at any point in the longitudinal direction between the root region and the blade tip. This cross section is characterized in particular by a surface orthogonal to this cross section being substantially parallel to the longitudinal direction of the rotor blade.

The profile section 132 has a suction side 120 and a pressure side 122, which define a rotor-blade thickness. The suction side 120 in this case is substantially convex. In contrast, the pressure side 122 is substantially concave. Due to this design, when moving air flows around the profile, a negative pressure can occur on the suction side relative to the pressure side, such that an aerodynamic lift can be generated. Alternatively, the pressure side 122 and/or the suction side 120 can also be designed in a different shape.

FIG. 2 shows a total of three substantially evenly spaced turbulators 200, each having a pair of vortex generators 202 on the suction side 120. The turbulators 200 in this case are in a suction-side trailing-edge region (not denoted in FIG. 2), which extends from the blunt trailing edge 114 in the direction of the leading edge 112. Such a suction-side trailing-edge region may have an extent of less than 30%, in particular less than 20%, of the chord. In the example shown here, the turbulators 200 are substantially arranged in a suction-side proximal region (not shown in FIG. 2) that has an extent of less than or equal to 10% of the chord starting from the blunt trailing edge 114 in the direction of the leading edge 112. Substantially the turbulators 200 are arranged at the blunt trailing edge 114, such that the vortex generators 202 project from the blunt trailing edge 114, and the projection length 204 extends substantially from the blunt trailing edge 114. The projection length 204 in this case extends substantially parallel to the rotor-blade thickness over the surface of the rotor blade. In the example shown, the projection length 204 is less than 50% of the trailing-edge height 130.

FIG. 3 shows, in addition to the three suction-side turbulators 200—as described above for FIG. 2—three substantially evenly spaced turbulators 200, each having a pair of vortex generators 202 on the pressure side 122. The pressure side 122 in this case also has, like the suction side 120, a pressure-side trailing-edge region (not shown in FIG. 3) having an extent of less than 30%, in particular less than 20% of the chord. The region of the pressure side referred to as the pressure-side proximal region (not shown in FIG. 3) has an extent of less than or equal to 10% of the chord, starting from the blunt trailing edge 114, in the direction of the leading edge 112. FIG. 3 shows that the turbulators on the pressure side 122 are arranged at the blunt trailing edge 114, i.e., in the pressure-side proximal region, such that the vortex generators 202 project from the blunt trailing edge 114, and the projection length (not denoted in FIG. 3) of these turbulators 200 also extends substantially from the blunt trailing edge 114.

The flat-back profiles represented in FIGS. 2 and 3 have a substantially straight blunt trailing edge 114. The trailing-edge height 130 (denoted in FIG. 2) corresponds substantially to the rotor-blade thickness in the corresponding profile section. In contrast, FIG. 4 shows a suction-side trailing-edge region having a suction-side transition region 206 adjacent to the trailing edge 114. The suction-side transition region 206 in this case is arranged between the suction-side profile contour 210 and the blunt trailing edge 114, and has a radius. Accordingly, the suction-side transition region 206 defines a rounding, which defines a transition from the suction-side profile contour 210 to the blunt trailing edge 114. In particular, the rounding, i.e., the suction-side transition region 206, is part of the suction-side trailing-edge region. In the example shown here, the vortex generators 202 are arranged immediately in front of the transition region 206, and in the example shown here the trailing-edge height 130 is more than 50% or more than 60% of the rotor-blade thickness. The rounding defines an additional curvature in the region of the trailing edge. As a result of the turbulators being positioned directly in front of this additional curvature, the flow can follow the profile. Thus, a profile contour having an additional curvature in the region of the trailing edge can be used in an optimal manner, in particular aerodynamically. Through this design, the wake region, and thus also the flow resistance, can be efficiently reduced and a new profile contour in the region of the trailing edge can be used in an aerodynamically advantageous manner.

In the embodiments shown as examples, the vortex generators 202 shown in FIGS. 2-4 extend substantially perpendicular to the surface of the rotor blade and describe an inhomogeneous geometry in the corresponding trailing-edge region. In particular, angles greater or less than 90° between the vortex generators 202 and the surface of the rotor blade are also possible. Whereas in FIG. 2 turbulators 200 are arranged on the suction side 120, alternatively or additionally turbulators 200 are also possible on the pressure side 122. Accordingly, in FIG. 3 and/or FIG. 4 turbulators 200 are also possible only on the suction side 120 or only on the pressure side 122. In particular, the vortex generators 202 shown in FIGS. 2-4 arranged in pairs next to each other may also be alternatively realized and/or arranged.

Without such turbulators 200, Kármán vortices and, in comparison, smaller disordered vortex pairs form in the dead wake region, where wake turbulences occur, which remove energy from the flow and thus cause high flow resistance. FIGS. 3 and 4 show, by way of example, that by arranging the turbulators 200 in the trailing-edge region on the suction side and the pressure side, increased mixing 118 of a separation at the blunt trailing edge 114 with high-energy flow can be achieved, and thus the size of the region of trailing turbulences 116 behind the blunt trailing edge 114 can be significantly reduced. In this way, in particular, drag can be reduced, and thus a lift-to-drag ratio can be increased. In particular, the lift-to-drag ratio can be maximally increased by an optimal configuration, preferably taking into account the variables influencing a lift coefficient and a drag coefficient. The lift-to-drag ratio determines the quality of the blade and additionally depends substantially on the blade profile and the angle of attack. The greater the lift-to-drag ratio, the lower the drag losses, and thus the better the efficiency. The arrangement of the turbulators makes it possible to achieve, in particular, a lift-to-drag ratio of greater than 20, in particular in the case of profiles having relatively thin trailing edges a lift-to-drag ratio of greater than 60, and/or in the case of thicker profiles a lift-to-drag ratio of about 20-40.

The selective disturbance of the homogeneous flow at the blunt trailing edge 114 described above prevents, or at least reduces, the formation of acoustically relevant periodic vortex streets, so that acoustic emission is reduced.

Figure 5:
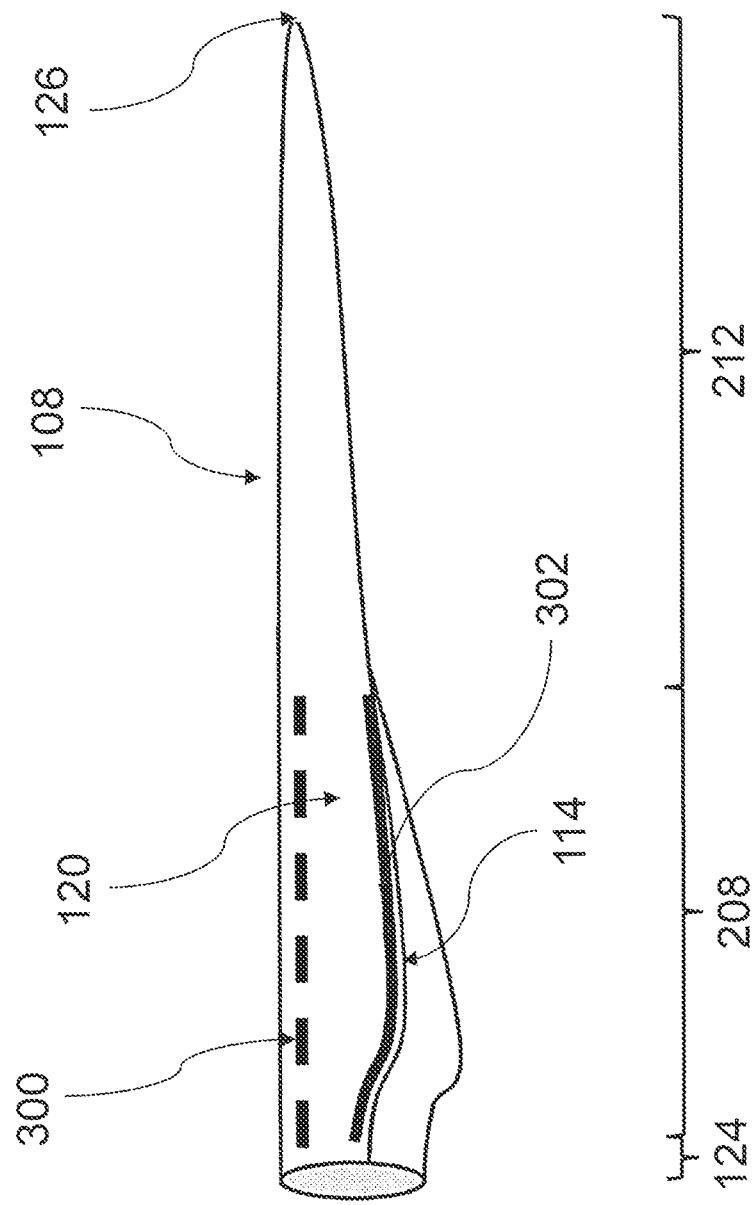
FIG. 5 shows a schematic view of a rotor blade in a view of the suction side with vortex generators.

FIGS. 5 and 6 each show a rotor blade 108. FIG. 5 shows a view of the suction side 120, and the view shown in FIG. 6 shows the pressure side 122.

The schematic representations of the rotor blade 108 in FIGS. 5 and 6 show a root region 124 at one end of the rotor blade 108 and a rotor-blade tip 126 at the opposite end. The distance between the rotor-blade tip 126 in the root region 124 defines the rotor-blade length. At the root region 124, or generally in the region near the root region 124, the rotor blade 108 has a large chord. At the rotor-blade tip 126, however, the chord is smaller. In the embodiments shown, the chord initially increases from the root region 124 in the direction of the blade inner region and then decreases again significantly up to a middle region of the rotor blade 108. From the middle region up to the rotor-blade tip 126, the chord is almost constant, or the decrease in the chord is significantly reduced. In the example shown here, a position of the turbulators 300 and 302 in FIGS. 5 and 301 in FIG. 6 extends in a region from the middle region to the root region 124. In the example shown here, this region also defines the blunt portion 208 having the blunt trailing edge 114.

The rotor blade 108 in this case may have a number of profile sections that define the profile course of the rotor blade 108. In particular, profile sections according to one of the FIGS. 2-4 may be arranged in the region between the root region 124 and the middle region. Preferably, profile sections of different shapes may also be provided. In the examples shown here, the profile sections located further in the direction of the blade tip 126 do not have a blunt trailing edge, and in particular define an outer portion 212 having a substantially closed profile. Arrangement of differently designed profile sections at different radius positions of the rotor blade 108 enables an aerodynamically optimal flow pattern to be achieved.

FIG. 5 shows an example of a first position of turbulators 300 and a second position of turbulators 302 on the suction side 120. The first position 300 in this case is located in a suction-side leading-edge region that has an extent of less than 80%, in particular less than 70% of the chord. The second position 302 may be located, in particular, in the suction-side trailing-edge region and/or the suction-side proximal region. The suction-side trailing-edge region in this case has an extent of less than 30%, in particular less than 20%, starting from the blunt trailing edge 114 in the direction of the leading edge. The suction-side proximal region has an extent of less than or equal to 10% of the chord, starting from the blunt trailing edge 114, in the direction of the leading edge.

According to another preferred embodiment, the rotor blade may have no turbulators at the first position 300.

The pressure side of the rotor blade shown in FIG. 5 (the pressure side is not shown in FIG. 5) may preferably have no turbulators or be realized as shown in FIG. 6, such that turbulators are provided on both the pressure side and the suction side.

FIG. 6 shows an example of a position of turbulators 301 on the pressure side 122. This position 301 in this case is located in a suction-side leading-edge region that has an extent of less than 80%, in particular less than 70% of the chord.

In the example shown here, the leading-edge region, which has an extent of less than 80%, in particular less than 70% of the chord, has no turbulators. Alternatively, another position of turbulators may be provided in the pressure-side leading-edge region.

REFERENCES 100 wind power installation
102 tower
104 nacelle
106 rotor
108 rotor blade
110 spinner
112 leading edge
114 blunt trailing edge
116 region of wake turbulences
118 mixing
120 suction side
122 pressure side
124 root region
126 rotor-blade tip
128 rounding
130 trailing-edge height
132 profile section
200 turbulator
202 vortex generator
204 projection length
206 suction-side transition region
208 blunt portion
210 suction-side profile contour
212 outer portion
300 position of turbulators
301 position of turbulators
301 position of turbulators The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor blade for a wind power installation, comprising:
a rotor blade body having:
a rotor-blade length extending between a root region and a rotor-blade tip, a rotor-blade depth extending between a leading edge and a blunt trailing edge, a rotor-blade thickness extending between a pressure side and a suction side, a chord located between the leading edge and the blunt trailing edge,
a suction-side trailing-edge region extending on the suction side and a pressure-side trailing-edge region extending on the pressure side, wherein at least one region chosen among the suction-side trailing-edge region and the pressure-side trailing-edge region extends from the blunt trailing edge in a direction of the leading edge with an extent that is less than 30% of the chord, and
wherein at least one region chosen among the suction-side trailing-edge region and the pressure-side trailing-edge region has at least one turbulator,
wherein the at least one turbulator extends over a rotor-blade surface with a projection length aligned substantially parallel to the rotor-blade thickness, the rotor blade comprising:
at least one profile section having the at least one turbulator and having a trailing-edge height of the blunt trailing edge, the projection length being less than or equal to 50% of the trailing-edge height, and/or
at least one profile section having the at least one turbulator and having a boundary layer and a boundary layer height that is constituted during operation, the projection length being more than 20% of the boundary layer height.

2. The rotor blade according to claim 1, wherein the at least one turbulator causes the at least one region chosen among the suction-side trailing-edge region and the pressure-side trailing-edge region to have an inhomogeneous geometry, such that vortex regions forming at the blunt trailing edge are prevented or weakened.

3. The rotor blade according to claim 1, wherein the at least one turbulator has a vortex generator, wherein the vortex generator is a vane vortex generator or wishbone vortex generator.

4. The rotor blade according to claim 3, wherein the at least one turbulator has a pair of vortex generators, wherein the pair of vortex generators project from the blunt trailing edge.

5. The rotor blade according to claim 1, wherein:
the blunt trailing edge of at least one profile section is straight and extends substantially parallel to the orientation of the rotor-blade thickness, and/or
a trailing-edge height of the blunt trailing edge of at least one profile section is more than 50% of the rotor-blade thickness.

6. The rotor blade according to claim 1,
wherein the rotor blade, between the root region having a substantially round cross section and an outer portion having a substantially closed profile, comprises a blunt portion that comprises the blunt trailing edge, the blunt portion extending to a relative rotor-blade length of greater than 30%.

7. The rotor blade according to claim 1, wherein for at least one profile section, the suction-side trailing-edge region comprises a suction-side transition region adjacent to the blunt trailing edge and/or the pressure-side trailing-edge region comprises a pressure-side transition region adjacent to the blunt trailing edge, wherein the suction-side transition region is arranged between a suction-side profile contour and the blunt trailing edge and/or the pressure-side transition region is arranged between a pressure-side profile contour and the blunt trailing edge, wherein the suction-side transition region and/or the pressure-side transition region have a radius.

8. The rotor blade according to the preceding claim 7, wherein the at least one turbulator is arranged in at least one region chosen among the suction-side transition region and the pressure-side transition region.

9. The rotor blade according to claim 1, wherein the at least one turbulator is arranged in a suction-side proximal region and/or a pressure-side proximal region adjacent to the blunt trailing edge, the suction-side proximal region and/or the pressure-side proximal region extending with less than or equal to 10% of the chord from the blunt trailing edge in a direction of the leading edge, wherein the suction-side proximal region comprises the suction-side transition region and/or the pressure-side proximal region comprises the pressure-side transition region.

10. The rotor blade according to claim 1, comprising:
a suction-side leading-edge region extending on the suction side and a pressure-side leading-edge region extending on the pressure side, the suction-side leading-edge region and/or the pressure-side leading-edge region extending from the leading edge in the direction of the blunt trailing edge with an extent of less than 80%, the suction-side leading-edge region and/or the pressure-side leading-edge region having at least one turbulator, and/or
a structural portion comprising the root region and having a substantially circular profile section, wherein at least one turbulator is arranged in the structural portion.

11. The rotor blade according to claim 1, comprising a plurality of turbulators, between adjacent turbulators is a distance in a direction of the rotor-blade length, wherein the distance is at least 1 times to maximally 100 times the projection length of the plurality of turbulators.

12. The rotor blade according to claim 1 wherein the extent is less than 20% of the chord.

13. A rotor for the wind power installation, comprising at least one rotor blade according to claim 1.

14. A wind power installation, comprising:
the rotor according to claim 13.

15. A rotor blade for a wind power installation, comprising:
a rotor blade body having:
a rotor-blade length extending between a root region and a rotor-blade tip, a rotor-blade depth extending between a leading edge and a blunt trailing edge, a rotor-blade thickness extending between a pressure side and a suction side, a chord located between the leading edge and the blunt trailing edge,
a suction-side trailing-edge region extending on the suction side and a pressure-side trailing-edge region extending on the pressure side, wherein at least one region chosen among the suction-side trailing-edge region and the pressure-side trailing-edge region extends from the blunt trailing edge in a direction of the leading edge with an extent that is less than 30% of the chord, and
a plurality of turbulators,
wherein at least one region chosen among the suction-side trailing-edge region and the pressure-side trailing-edge region has the plurality of turbulators,
wherein adjacent turbulators of the plurality of turbulators are spaced apart by distances in the direction of the rotor blade length, the distances becoming smaller as the respective turbulator of the plurality of turbulators are spaced farther from the root region, and/or
a projection length of the plurality of turbulators becoming smaller with greater spacing from the root region, wherein the projection length of the plurality of turbulators becomes smaller discontinuously.

* * * * *